United States Patent [19]

Rosenthal

[11] Patent Number: 4,504,888
[45] Date of Patent: Mar. 12, 1985

[54] PHOTOGRAPHER'S DIFFUSER LIGHT

[75] Inventor: Philip R. Rosenthal, Old Saybrook, Conn.

[73] Assignee: Pennywise Enterprises, Inc., Old Saybrook, Conn.

[21] Appl. No.: 572,979

[22] Filed: Jan. 25, 1984

Related U.S. Application Data

[63] Continuation-in-part of Ser. No. 477,864, Mar. 23, 1983, abandoned.

[51] Int. Cl.³ ............................................. G03B 15/02
[52] U.S. Cl. ....................................... 362/18; 362/17; 362/96; 362/218; 362/250; 362/269; 362/294; 362/307; 362/310; 362/311; 362/319; 362/345; 362/346; 362/352; 362/368; 362/370; 362/371; 362/373; 362/375; 362/417; 362/427; 362/449; 362/450

[58] Field of Search ................... 362/17, 18, 96, 218, 362/250, 269, 294, 307, 310, 311, 319, 345, 346, 352, 368, 370, 371, 373, 375, 417, 427, 449, 450

[56] References Cited

U.S. PATENT DOCUMENTS

| 4,052,607 | 10/1977 | Larson | 362/18 |
| 4,109,301 | 8/1978 | Wakimura | 362/16 |
| 4,120,023 | 10/1978 | McReynolds | 362/16 |
| 4,190,880 | 2/1980 | Esaki | 362/16 |
| 4,446,506 | 5/1984 | Larson | 362/450 X |

Primary Examiner—Stephen J. Lechert, Jr.
Attorney, Agent, or Firm—DeLio & Associates

[57] ABSTRACT

A light is described having a hollow body with a support means pivotally connected to the body for aiming the light, a transmission plate detachably held in its mount at the front of the body, a light source detachably mounted on a mounting plate which is in turn detachably mounted on the back end of the light, and a vent means for venting hot air from the interior of the light.

28 Claims, 22 Drawing Figures

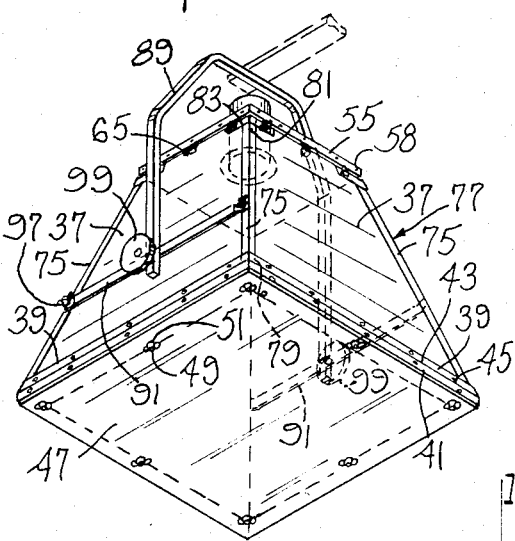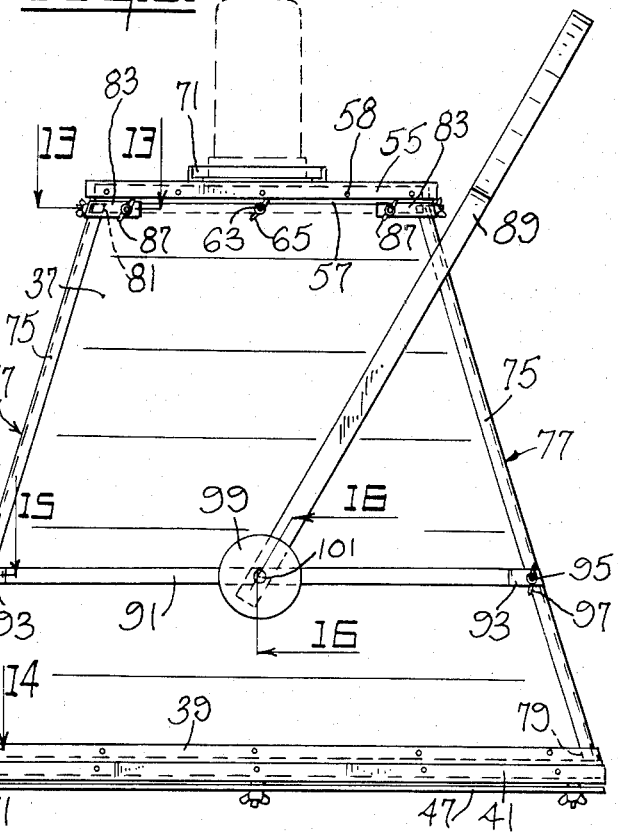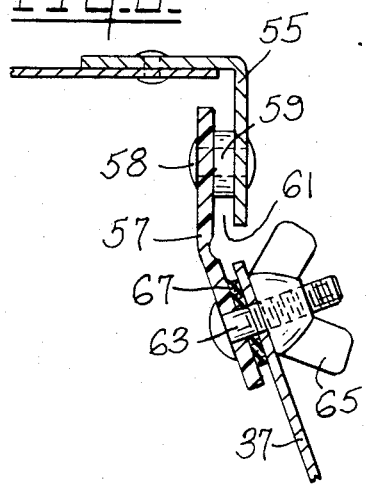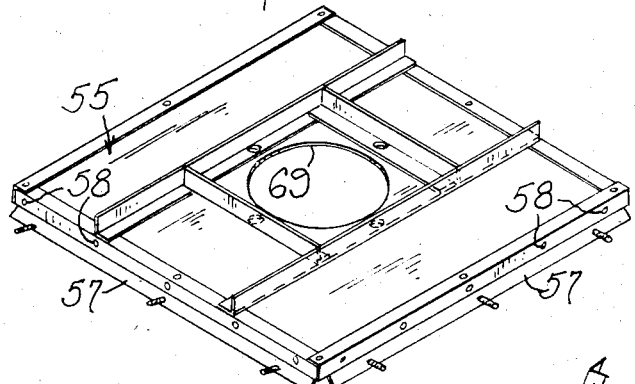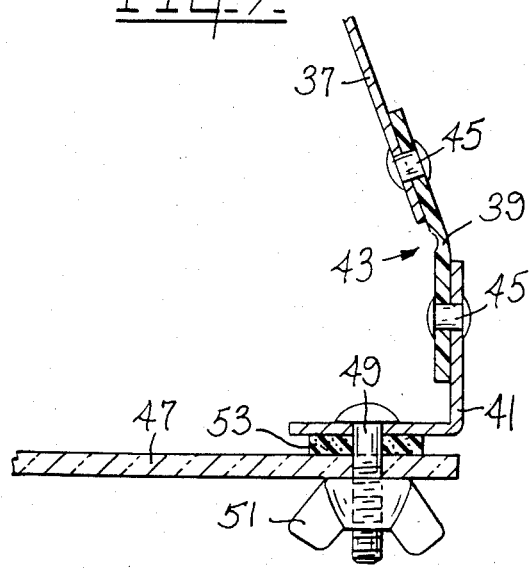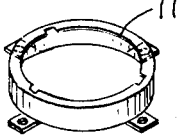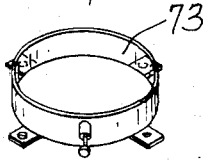

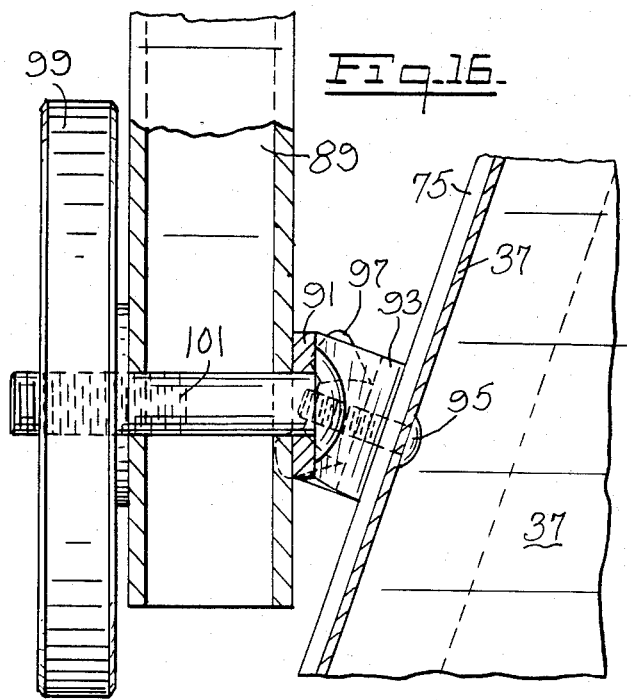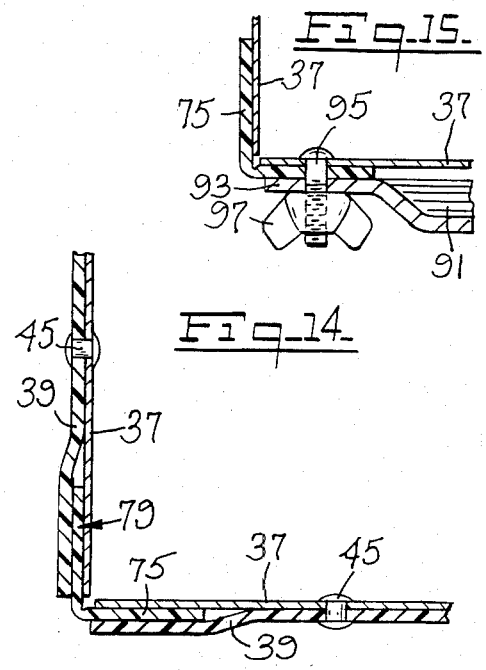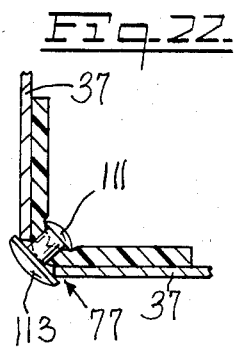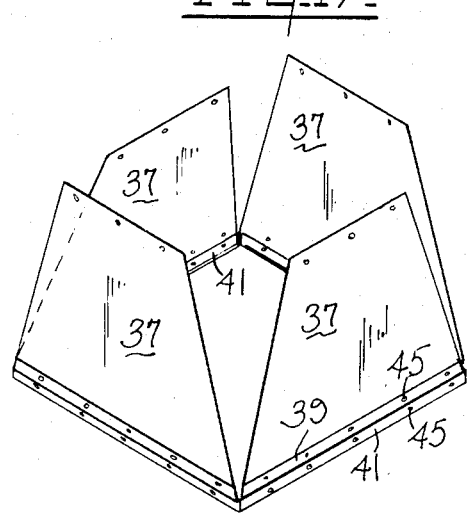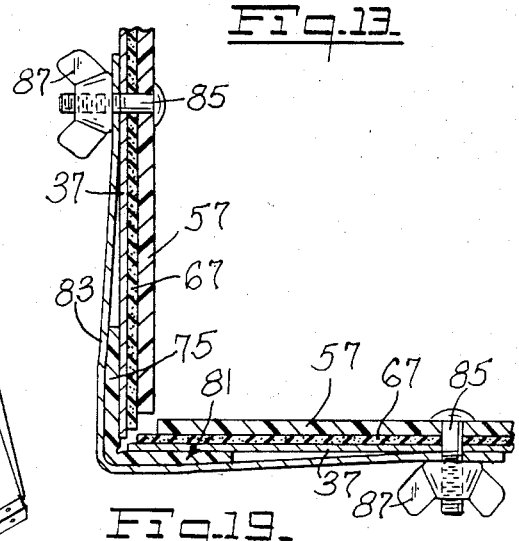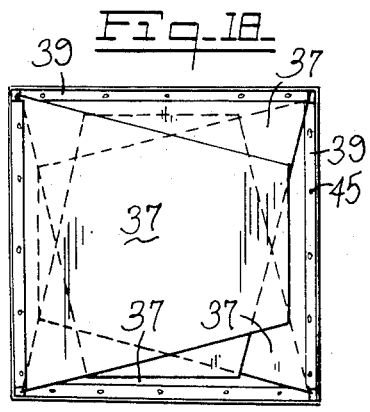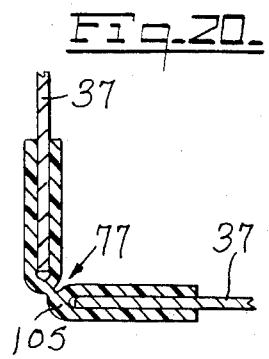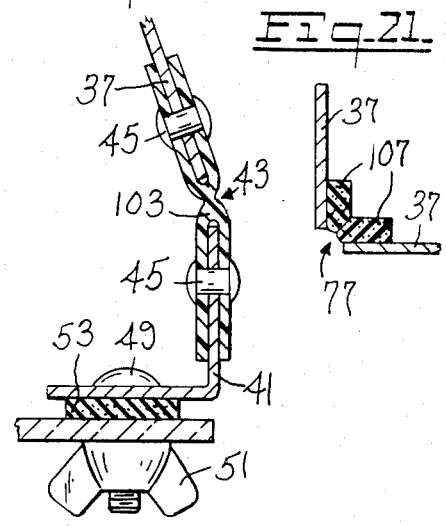

PHOTOGRAPHER'S DIFFUSER LIGHT

This application is a continuation-in-part of U.S. Patent Application Ser. No. 477,864, filed Mar. 23, 1983, which application is abandoned.

The invention relates to a light fixture for use by photographers, in particular to a light fixture with removable parts and which can also be collapsible and portable.

BACKGROUND OF THE INVENTION

The prior art shows numerous designs for light fixtures. These light fixtures generally have a light source, a reflector often integrally constructed with the body, and a front transmission plate which allows the radiation from the light source to escape and prevents the entrance of dust and other debris into the interior of the light fixture. These light fixtures are also often provided with vents to permit the escape of hot air produced by waste heat from the light source, and some designs have fans or blowers to forceably remove the hot air.

However, in most designs, the light source is permanently fixed and the front plate which transmits the radiation is also fixed. This creates difficulties for a photographer who has a need for quickly changing the type of illumination which he is using. Using light fixtures with a permanently fixed light source, he is required to store a large number of complete light units, one for each type of illumination he may need. Each individual light fixture will have to be separately mounted and aimed before it can be used.

There are many types of illumination which a photographer might require, and many kinds of light sources and filters which can be used to provide that illumination. For example, some light sources are very short in the time dimension, i.e, stroboscopic light sources, and some are very narrow in the frequency dimension, i.e., sodium or mercury lamps, while other may be very broad in those dimensions. Some light sources emit light of a very high color temperature in the blue or blue-white range, while others emit light from a lower color temperature in the yellow to red range. Some photographic films are more sensitive to, or are designed for use in conjunction only with light of a specified color temperature. In order for a photographer to have a range of suitable light sources to choose from, he was previously required to store multiple light units, each having a single type of light source.

It is also widely known that a transmission plate can be placed in front of the light fixture to modify the illumination in a variety of ways. For example, a harsh light can be transformed into soft illumination by the use of a diffusing plate made of ground glass or plexiglas. The diffuseness of the light can be modified by varying the surface roughness of the diffusing plate. The color of the illumination can be modified by using a colored filter, the strength of the illumination can be modified by using a neutral density filter, and the directional pattern of the exiting light can be modified with a fresnel lens if desired. Considering the numerous styles of transmission plates and light sources that a photographer might desire to employ, it becomes imperative to employ a design which allows interchangeable light sources and transmission plates. These are needs which are not met in prior art designs.

U.S. Pat. No. 3,375,366 shows a high intensity printing lamp having an integral body reflector, a light source, a front transmission plate, and a fan for cooling. However, this design does not provide for the use of an interchangeable light source or front transmission plate.

U.S. Pat. No. 2,831,104 shows a similar photographic illuminating means. In this design the light source can be replaced, but only by another light source having the same style of fitting on its base. Furthermore, replacing the light source would be a difficult and awkward job. The front transmission plate is also not easily changed.

U.S. Pat. No. 2,069,950 shows a surgical lamp which allows the light source to be easily replaced, but which does not accept different styles of light sources nor does it permit the transmission plate to be easily changed.

SUMMARY OF THE INVENTION

The present invention is a light fixture which can be aimed and locked into position, and which is so arranged as to allow different types of light sources to be easily and quickly mounted and dismounted from the body of the light fixture. A front transmission plate which may be a diffuser plate, a transparent plate, a colored plate, or some other type of filter, can also be easily changed to provide the desired type of illumination. Vents are provided to allow the escape of heated air from the interior of the light fixture, and an optional fan or blower may be used to force the heated air from the interior of the light. The interior of the light fixture may have a coating applied to it with approriate light absorbing or light reflecting properties where required. The light fixture may also be constructed in an embodiment which features a collapsible hollow body and which consists of a transmission plate mounting means; hinging means attached to said transmission plate mounting means; a plurality of walls with front, rear and lateral sides, the front sides being attached to said hinging means so that the walls may be moved between a collapsed position in which they are stacked upon each other and a raised position with junctions between their lateral sides whereby a rigid hollow body is defined by said walls; a light source mounting plate detachably mounted onto the rear ends of said walls when said wals form said hollow body; a vent between said body and said light source mounting plate for venting hot air from the interior of said hollow body; a light source detachably mounted on the light source mounting plate; a plurality of light sealing means detachably attached to the junctions of said walls; a support means pivotally and detachably connected to the outer surface of said hollow body for aiming the light; means for adjusting the position of the body relative to the support means; and a transmission plate detachably mounted on the transmission plate mounting means.

BRIEF DESCRIPTION OF THE DRAWINGS

FIG. 5 is a perspective view of another embodiment of the invention, featuring a collapsible construction;

FIG. 6 is a side elevational view of the light fixture shown in FIG. 5;

FIG. 7 is a view, partially in section, of a wall, hinge, transmission plate mount and transmission plate of the embodiment of FIG. 5;

FIG. 8 is a view, partially in section, of a wall, light source mount and hinge of the embodiment of FIG. 5;

FIG. 9 is an isometric view of the light source mount of the embodiment of FIG. 5;

FIGS. 10 and 11 are perspective views of mounting collars for a light source of the embodiment of FIG. 5;

FIG. 12 is a perspective view of a light sealing strip of the embodiment of FIG. 5;

FIG. 13 is a view, partially in section, taken along line 13—13 in FIG. 6;

FIG. 14 is a view, partially in section, taken along line 14—14 in FIG. 6;

FIG. 15 is a view, partially in section, taken along line 15—15 in FIG. 6;

FIG. 16 is a view, partially in section, taken along line 16—16 in FIG. 6;

FIG. 17 is a perspective view of the walls, hinges and transmission plate mount with the walls in a raised or open position;

FIG. 18 is a top plan view of the walls, hinges and transmission plate mount with the walls in a collapsed or closed position;

FIG. 19 is a view, partially in section of an alternate configuration of a wall connected by a hinge to the transmission plate mount.

FIGS. 20, 21 and 22 are top views, partially in section, of alternate configurations of light sealing strips between the walls of the collapsible embodiment of the invention.

DETAIL DESCRIPTION OF THE PREFERRED EMBODIMENTS

Figure 1:
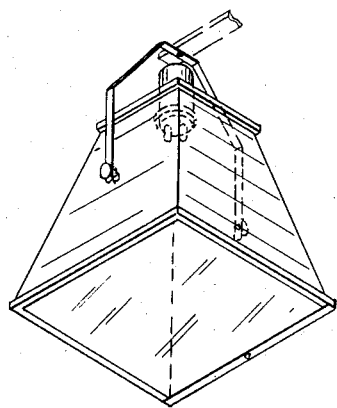
FIG. 1 is a perspective view of an embodiment of the light fixture according to the present invention.
Figure 2:
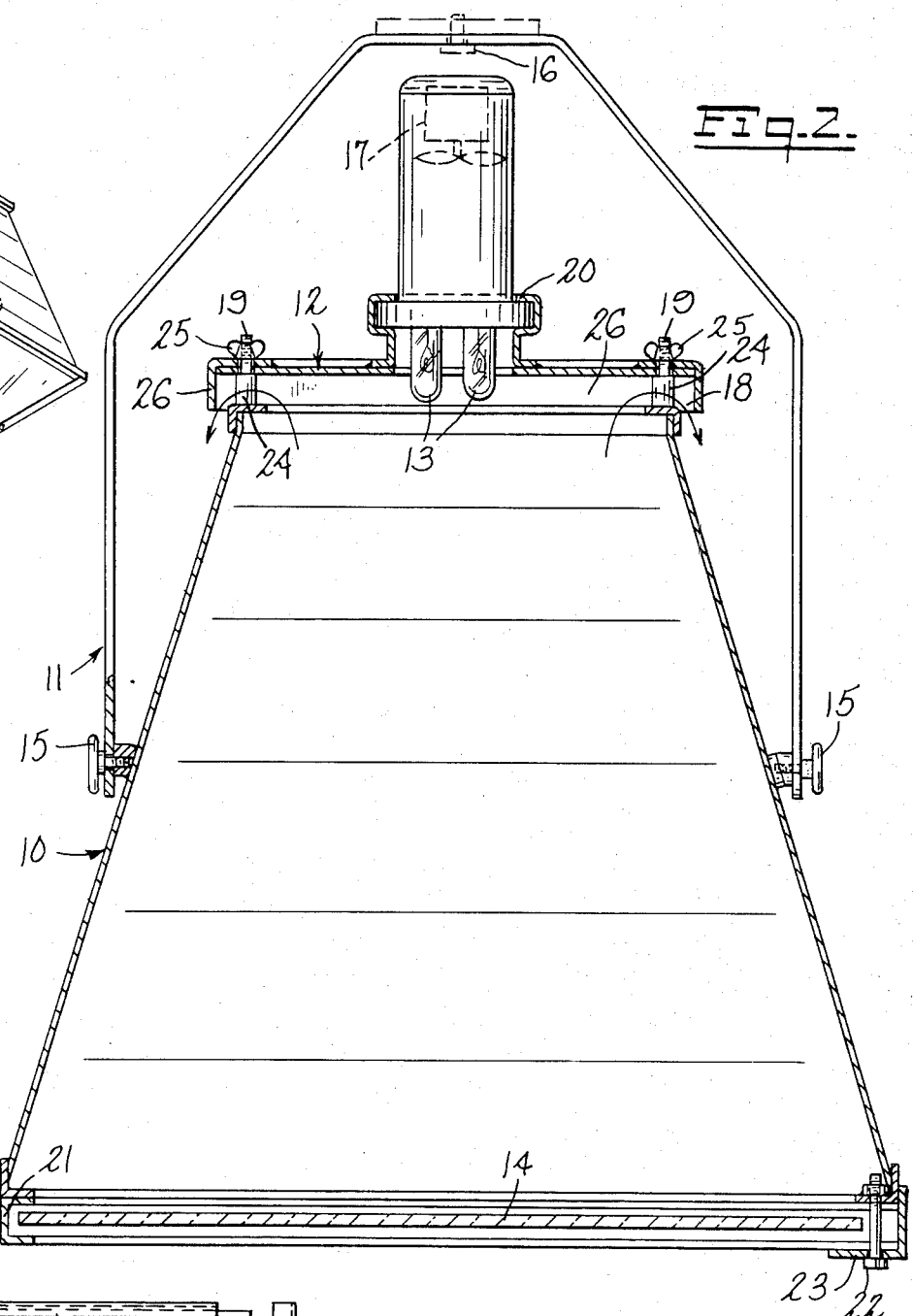
FIG. 2 is a sectional view taken along line 2—2 of FIG. 1.

FIG. 1 shows an overall perspective view of the light fixture. Referring to FIG. 2, the body of the light 10 is pivotally supported by bracked 11 which is mounted on the exterior of the light body. Bracket 11 pivots on threaded lock knobs 15 which can be securely tightened to lock the light into position after it has been aimed. Bracket 11 is pivotally mounted on bolt 16 to an overhead support shown in phantom. The axes of pivot on bolt 16 and threaded lock knobs 15 are orthogonal, permitting the light to be aimed in any desired direction.

In a preferred embodiment, mounting bracket 11 is U-shaped and attached to opposite sides of the body of the light 10, although many other forms of mounting systems would be acceptable.

At the back of the light, light source 13 provides the required illumination. The light source is detachably mounted to the light source mounting plate 12 which in turn is detachably mounted to the body of the light 10.

Light source 13 in this embodiment is illustrated as a stroboscopic lamp, however, a variety of types of conventional light source units can be mounted on the light source mounting plate. A cooling device 17, shown in dotted lines, is optional and can be used to help cool the light by forcing heated air out of the interior of the light through vents 18 which are located in the gap between the body of the light 10 and the light source mounting plate 12. Cooling device 17, although shown as a fan, could be a blower or any other conventional means for moving air. The ventilating gap 18 between the body of the light 10 and the light source mounting plate 12 is provided by means of spacers 24 which are mounted on threaded studs 19. The size of the spacers may be varied to allow greater or less ventilation. Light source mounting plate 12 is provided with downwardly curved flanges 26 around its perimeter for positioning the mounting plate and preventing the escape of stray light while still allowing air to be vented out of gap 18.

The light source mounting plate 12 is detachably connected to the body of the light 10 via threaded studs 19 and wingnuts 25.

Light source 13 is detachably mounted to the light source mounting plate 12 via a conventional mounting collar 20. Mounting the collar 20, which can be seen more clearly in FIG. 4, will accept a variety of standard light sources which can quickly and easily be attached to or removed from the light source mounting plate without disturbing the aiming of the light. Other types of light sources which are not compatible with the mounting collar used (which may be of a bayonet, tongue and groove or other suitable design) can be custom fitted to a separate light source mounting plate, and the entire light source mounting plate can be detached quickly by removing the wingnuts from threaded studs 19 and replacing the previous light source and light source mounting plate with the custom fitted one.

The front end of the light is covered by transmission plate 14 through which all of the illumination passes. This plate can be clear, for harsh lighting effects; translucent, for diffuse lighting; colored, for colored lighting; or have any other desired properties for modifying the exiting light.

Transmission plate 14 is held in a channel which extends around the circumference of the front end of the light. A portion of the channel 21 is permanently attached to a body of the light, while a separate portion of the channel 23 is removable. The removable portion of the channel 23 is held in position by bolt 22 which can be quickly removed for changing the transmission plate.

Figure 3:
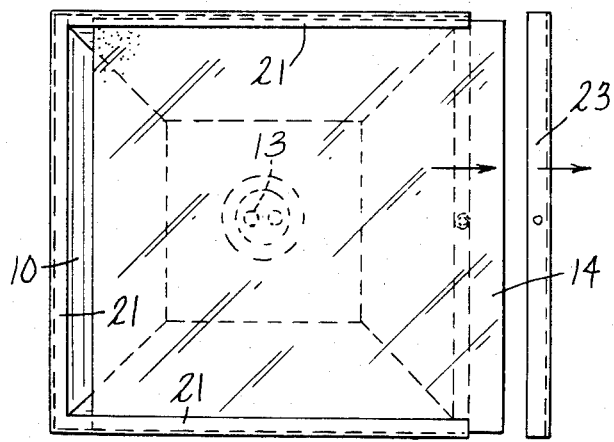
FIG. 3 is a bottom plan view showing the removable transmission plate.

FIG. 3 shows the bolt 22 and the removable portion of the channel 23 removed, with the transmission plate 14 partially slid out of the fixed portion of its retaining channel 21. The retaining channel consisting of fixed portion 21 and removable portion 23 is appropriately sized to permit transmission plates of varying thickness to be inserted, or to permit multiple plates to be inserted simultaneously.

Figure 4:
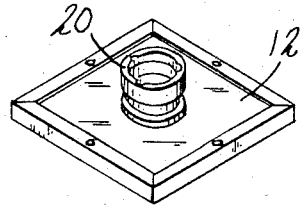
FIG. 4 is a perspective view of the light source mounting plate.

FIG. 4 shows the light source mounting plate 12 with the four holes around its perimeter which hold it in position by means of threaded studs 19 and wingnuts 25. The standard bayonet mount 20 for the light source 13 is also shown with greater clarity.

The interior of the body 10 is preferably coated with a white, non-yellowing, highly reflective paint to maximize the radiation emitted from the light, and to minimize its absorption by the body of the light. However, for some application it may be desirable to minimize reflected radiation so that only direct illumination from the light source is obtained. In these circumstances, the interior of the body may be coated with a light absorbing substance rather than a reflective substance. For other applications, it may be desirable to modify the emitted radiation from the light by using other coatings on the interior of the body. Interchangeable body units with different internal coatings can be used by removing lock knobs 15, inserting a new body into bracket 11, and replacing the light source mounting plate 12 and transmission plate 14.

Among the advantages of the present invention, is that the mounting plate 12 can be interchanged with other mounting plates containing two or more mounting collars or light sources therein, thus providing flexibility in selecting the number and type of light sources utilized.

Another embodiment of the invention features a collapsible hollow body structure which is shown in FIGS. 5 and 6. FIGS. 5 and 6 show this embodiment of the invention in its assembled mode, ready for use. The walls 37 of the invention are attached to hinges 39. In the preferred mode of this embodiment the hinges are a flexible rubber or flexible natural or synthetic organic polymer. The hinges are attached to the transmission plate mount 41 which is shown partially in dotted lines in FIG. 5. The hinges extend around the perimeter of the walls 37 and the perimeter of the transmission plate mount 41. By extending around the perimeters they serve the dual purpose of acting as hinges and of preventing light from entering or escaping at the junction 43 of the walls 37 and transmission plate mount 41 when the device is in use. As best seen in FIG. 7, hinge 39 is attached to wall 37 and to the transmission plate 41 by rivets 45. In this embodiment of the invention, the removable transmission plate 47 is attached to the transmission plate mount 41 by screws 49 and wingnuts 51. A strip of material 53, which in the preferred mode of this embodiment is foam rubber, is positioned between the transmission plate mount 41 and the transmission plate 47 and extends around the perimeter of the plate to provide a secure fit and to prevent light from entering or escaping.

Referring again to FIG. 6, a light source mount 55 is detachably attached to the walls 37 by hinges 57 which hinges are also of a flexible rubber or plastic material as are hinges 39. In the preferred form of this embodiment, the hinges 57 are located on the inner side of the walls 37 and mount 55 and are shown as dotted lines in FIG. 6. As shown in FIG. 8 the light source mount 55 is permanently attached to hinge 57 by rivets 58. Spacers or grommets 59 are placed between the hinge 57 and the light source mount 55 and provide an opening or vent 61 between the mount and hinge through which heat can escape, but which does not allow light to enter or escape. The opening extends around the perimeter of light source mount 55. Wall 37 is attached to hinge 57 by screws 63 and wingnuts 65. A strip of material 67 which in the preferred embodiment is foam rubber is positioned between the hinge and wall and extends around the perimeter of the walls to provide a secure fit and to prevent light from entering or escaping. Use of the screws 63 and wingnuts 65 allows the removal of the light source mount 55 from walls 37. FIG. 9 shows the light source mount 55 with hinges 57 and screws 63 before it is attached to the walls of the invention. Circular opening 69 is used for the insertion of a light source. FIGS. 10 and 11 are, respectively, examples of mounting collars 71 and 73 for supporting a light source which can be interchangeably attached to the light source mount. Any number of light sources and mounting collars can be used with this embodiment of the invention.

Referring again to FIGS. 5 and 6, light sealing members 75 are attached at the intersections 77 of the walls 37. These members are elongated strips which in the preferred embodiment, are made of rubber or plastic. FIG. 12 shows the configuration of the strips. The strips 75 extend the entire length of the wall intersections 77. They are attached at their forward ends 79 by sliding them between the hinges 39 and walls 37. Their rearward ends 81 are held in place by clamps 83. Referring to FIG. 13 strip 75 is positioned between clamps 83 and wall 37. Screws 85 extends through hinge 57, foam rubber strip 67, wall 37 and clamp 83. Wingnuts 87 hold the assembly together and allows the removal of the clamp, walls, light sealing strips 75 and foam rubber strip 67.

FIG. 14 illustrates how the forward ends 79 of strips 75 are positioned between the hinges 39 and the walls 37.

Referring again to FIGS. 5 and 6, the device is pivotally and detachably connected to a support member 89 by means of bars 91 which are detachably connected to the walls 37 and the sealing strips 75. Referring to FIG. 15, the ends 93 of bar 91 are held in place by screws 95 which extend through wall 37 and sealing strip 75, and by wingnuts 97. The ends 93 of bars 91 are shaped to fit flush with the wall surfaces when the device is assembled, so as to insure a tight fit.

Referring again to FIGS. 5 and 6, support member 89 is held in position by hand wheel 99 which is also seen in FIG. 16, where it is shown positioned on screw 101 which also extends through support member 89. In FIG. 16 there is also shown screws 95 wingnuts 97 and bar 91 with its end 93. Wall 37 which is perpendicular to the wall to which bar 91 is attached is also shown as is light sealing strip 75, one side of which is shown by dotted line.

FIG. 17 shows the walls in an upright but unclosed position. Referring to FIG. 18, there is shown the walls 37 of the device in their collapsed position ready for transportation.

FIG. 19 is an alternative means of attaching transmission plate 41 and walls 37 by using a double U-shaped rubber hinge 103.

FIGS. 20, 21 and 22 are partial cross sectional views showing alternate ways of light sealing the junctions 77 of walls 37. In FIG. 20, the walls 37 are held in place by double U-shaped elongated light sealing rubber strips 105 which extend the length of the junction. In FIG. 21, foam rubber strips 107 are attached to walls 37 and extend the length of the walls. When the walls are positioned so as to form the hollow body of the invention, the strips meet and seal the junction to prevent light from entering or leaving the hollow body thru the junction of the walls. FIG. 22 shows rubber strips 109 which extend the length of the walls 37 and are positioned inside the hollow body. They are held in position by a series of buttons 111 which are affixed to the strips. The strips are attached by sliding them down the junction 77 so that the heads of the buttons 113 extend outside the hollow body.

A cooling device as shown in FIG. 2 can also be added to this embodiment.

The interior of the walls are also coated as in the embodiment of FIGS. 1 and 2 as disclosed above.

While preferred embodiments of the invention have been set forth for purposes of disclosure further embodiments of the invention as well as modifications to the disclosed embodiments which do not depart from the spirit and scope of the invention may occur to others skilled in the art. Accordingly, the appended claims are intended to cover all embodiments and modifications and modes of practicing the invention which do not depart from the spirit and scope of the invention.

What I claim is:

1. A light fixture comprising:

a rigid hollow body having a front end and a back end, an inner surface and an outer surface;

a support means pivotally connected to the outer surface of the body for aiming the light;

means for adjusting the position of the body relative to the support means;

a transmission plate mounting means connected to the front end of the body;

a transmission plate detachably mounted to the transmission plate mounting means;

a light source mounting plate detachably mounted on the back end of the body;

a light source detachably mounted on the mounting plate; and a vent between said body and said light source mounting plate for venting hot air from the interior of the hollow body.

2. The light fixture of claim 1 including a means for actively forcing hot air out of the interior of the hollow body.

3. The light fixture of claim 1 wherein the support means comprises a U-shaped bracket pivotally conneced to opposite sides of the outer surface of the hollow body.

4. The light fixture of claim 1 wherein the inner surface of the hollow body has a coating applied to it.

5. The light fixture of claim 4 wherein the coating is a white, non-yellowing highly reflective substance.

6. The light fixture of claim 1 wherein the hollow body is shaped as a truncated four-sided pyramid.

7. The light fixture of claim 1 wherein the vent means is provided by spacing apart the light source mounting plate and the back end of the hollow body.

8. The light fixture of claim 1 wherein the light source mounting plate includes a standardized bayonet mount for detachably mounting the light source.

9. The light fixture of claim 1 wherein the transmission plate mounting means comprises a channel around the periphery of the front end of the body which permits transmission plates of varying thickness to be slid into the channel.

10. The light fixture of claim 1 wherein the light source is a stroboscopic light source.

11. The light fixture of claim 1 wherein the support means includes a lock for securely locking the light in its correct alignment.

12. The light fixture of claim 1 wherein the transmission plate is a light diffuser which diffuses the light to provide even, glare-free illumination.

13. A portable light fixture comprising:

a transmission plate mounting means;

hinging means attached to said transmission plate mounting means;

a plurality of walls with front, rear and lateral sides, the front sides being attached to said hinging means so that the walls may be moved between a collapsed position in which they are stacked upon each other and a raised position with junctions between their lateral sides whereby a rigid hollow body is defined by said walls;

a light source mounting means detachably mounted onto the rear ends of said walls when said walls form said hollow body;

a vent between said body and said light source mounting plate for venting hot air from the interior of said hollow body;

a light source detachably mounted on the light source mounting plate;

a plurality of light sealing means at the junctions of said walls; and a transmission plate detachably mounted on the transmission plate mounting means.

14. The light fixture of claim 13 wherein said light sealing means comprise elongated strips which extend the length of said junctions.

15. The light fixture of claim 13 wherein the outer surface of said hollow body is pivotally and detachably connected to a support means for aiming said light fixture.

16. The light fixture of claim 15 wherein the support means comprises a U-shaped bracket pivotally and detachably connected to the outer surfaces of opposite walls of the hollow body.

17. The light fixture of claim 13 wherein the inner surface of the hollow body has a coating applied to it.

18. The light fixture of claim 4 wherein the coating is a white, non-yellowing highly reflective substance.

19. The light fixture of claim 13 wherein the hollow body is shaped as a truncated four-sided pyramid.

20. The light fixture of claim 13 wherein the vent means is provided by spacing apart the light source mounting plate and the back end of the hollow body.

21. The light fixture of claim 13 wherein the light source mounting plate includes a detachable mounting collar for supporting a light source.

22. The light fixture of claim 13 wherein the light source is a stroboscopic light source.

23. The light fixture of claim 15 wherein the support means includes a means for securely locking the light in its correct alignment.

24. The light fixture of claim 13 wherein the transmission plate is a light diffuser which diffuses the light to provide even, glare-free illumination.

25. The light fixture of claim 13 wherein the hinging means extends around the periphery of the transmission plate mounting means.

26. In a light fixture comprising a transmission plate mounting means; a plurality of walls with front, rear and lateral sides; a light source mounting means attached to the rear sides of said walls; a transmisson plate mounted on said transmission plate and a light source mounting means, the improvement comprising:

hinging means attached to the front ends of said walls and to the transmission plate mounting means and extending around the perimeter of said transmission plate mounting means so that said walls may be moved between a collapsed position in which they are stacked upon each other and a raised position with junctions between their lateral sides whereby a hollow rigid body is defined by said walls.

27. The improvement of claim 27 wherein said hinging means also prevents light from entering into or escaping from between the transmission plate mounting means and the walls.

28. The improvement of claim 26 wherein said hinging means is a flexible organic polymer.

* * * * *